United States Patent
Edelson

(10) Patent No.: US 7,126,298 B2
(45) Date of Patent: Oct. 24, 2006

(54) MESH CONNECTED BRAKE ARRAY FOR ELECTRICAL ROTATING MACHINES

(75) Inventor: Jonathan Sidney Edelson, Sommerville, MA (US)

(73) Assignee: Borealis Technical Limited(GI)

( * ) Notice: Subject to any disclaimer, the term of this patent is extended or adjusted under 35 U.S.C. 154(b) by 0 days.

(21) Appl. No.: 10/511,935

(22) PCT Filed: Apr. 22, 2003

(86) PCT No.: PCT/US03/12445

§ 371 (c)(1),
(2), (4) Date: Oct. 19, 2004

(87) PCT Pub. No.: WO03/092150

PCT Pub. Date: Nov. 6, 2003

(65) Prior Publication Data

US 2005/0242758 A1    Nov. 3, 2005

Related U.S. Application Data

(60) Continuation-in-part of application No. 10/723,010, filed on Nov. 26, 2003, which is a division of application No. 09/713,654, filed on Nov. 15, 2000, now Pat. No. 6,657,334.

(60) Provisional application No. 60/375,616, filed on Apr. 24, 2002, provisional application No. 60/242,622, filed on Oct. 23, 2000.

(51) Int. Cl.
*H02P 3/22* (2006.01)

(52) U.S. Cl. ..................................... 318/380; 318/376

(58) Field of Classification Search ......... 318/375–380
See application file for complete search history.

(56) References Cited

U.S. PATENT DOCUMENTS

| | | | |
|---|---|---|---|
| 3,688,171 A | 8/1972 | Salihi et al. | |
| 3,815,002 A | 6/1974 | Clemente et al. | |
| 3,876,923 A | 4/1975 | Humphrey et al. | |
| 3,991,352 A | 11/1976 | Fry et al. | |
| 4,328,454 A * | 5/1982 | Okuyama et al. | 318/803 |
| 4,607,204 A | 8/1986 | Setoya | |
| 4,678,063 A | 7/1987 | Kitaoka et al. | |
| 4,755,732 A | 7/1988 | Ando | |
| 4,996,470 A | 2/1991 | Rowan et al. | |
| 5,068,587 A | 11/1991 | Nakamura | |
| 5,420,491 A | 5/1995 | Kanzaki et al. | |
| 5,449,962 A | 9/1995 | Shichijyo | |
| 6,351,095 B1 | 2/2002 | Edelson | |
| 6,426,605 B1 * | 7/2002 | Toliyat et al. | 318/801 |

* cited by examiner

*Primary Examiner*—Bentsu Ro

(57) ABSTRACT

In the present invention, several polyphase devices are connected together: an inverter (420), and electrical rotating machine (440), and a resistive load or braking resistor (430). The purpose of the resistive load is to dissipate excess electrical which may be produced when the inverter acts to slow down the rotating machine (440), causing the rotating machine to act as a generator. In common art, this resistive load is a single DC resistor coupled to the DC link of the inverter via a separate resistor control transistor. In the present invention, the resistive load is a mesh connected array of resistors, and is electrically connected to the same inverter output terminals that the rotating machine is connected to. When it is desired that the resistors absorb energy, for example from a braking operation, then the harmonic content of the inverter output is adjusted, thus placing voltage differences across the resistor array (430) and causing current to flow in the resistors.

4 Claims, 5 Drawing Sheets

Fundamental

Third Harmonic

Fifth Harmonic

Seventh Harmonic

Motor:
L=6 connection;
3rd harmonic drive;
72-degree phase angle

Resistor array:
L=5 connection;
3rd harmonic drive;
0-degree phase angle

MESH CONNECTED BRAKE ARRAY FOR ELECTRICAL ROTATING MACHINES

This application is the U.S. national stage application of International Application PCT/US03/12445, filed Apr. 22, 2003, which international application was published on Oct. 16, 2003, as International Publication WO03092150 in the English language. The International Application claims the benefit of U.S. Provisional Application No. 60/375,616, filed Apr. 24, 2002. This application is a continuation in part of U.S. application Ser. No. 10/723,010, filed Nov. 26, 2003, which is a division of U.S. application Ser. No. 09/713,654, filed Nov. 15, 2000, now U.S. Pat. No. 6,657,334, which claims the benefit of U.S. Provisional Application No. 60/242,622, filed Oct. 23, 2000. The above-mentioned patent applications are assigned to the assignee of the present application and are herein incorporated in their entirety by reference.

TECHNICAL FIELD

The present invention relates to high phase order electrical rotating machines.

BACKGROUND ART

When the drive motor is used as a brake during operation of an elevator with the induction motor driven by an inverter, the rotating speed of the motor is higher than the frequency of the inverter, and regenerated power is formed in the motor. As this regenerated power flows into the DC circuit of the inverter, a resistor in the DC circuit absorbs the regenerated power. A number of approaches for controlling this have been disclosed; for example Kitaoka and Watanabe (U.S. Pat. No. 4,678,063) disclose an elevator control system connected to a source of three-phase alternating current which is rectified by a converter to direct current which is converted to a variable-voltage variable-frequency A.C. voltage which, in turn, drives the elevator hoist motor. A resistor and a switch are connected across the D.C. terminals of the converter. When the motor is operating in the regenerative mode, the switch is closed to permit the regenerated circuit to flow through the resistor, which dissipates or consumes the regenerated power. When the regenerated power being consumed by the resistor is detected to exceed a predetermined value, the excess regenerated power is returned to the A.C. source through a regenerative inverter. Kanzaki and Yamada (U.S. Pat. No. 5,420,491) disclose the conversion of an analog DC link bus voltage in an induction motor drive to a digital DC link bus voltage so that if the DC link bus voltage exceeds an ON voltage threshold of a switch and this condition exists a holding time later, the switch closes, thereby allowing regenerated power in the DC link to be dissipated in a resistor connected across the DC link. And if the DC link bus voltage falls below an OFF voltage threshold and that condition exists a latching time later, the switch is opened so that no regenerated power may be dissipated through the resistor. Systems disclosed in the prior art use a variety of methods for sensing when regenerated power on the DC supply line, but they all use a switch (a transistor in the case of Kitaoka and Watanabe) to allow the regenerated power to flow through the resistor.

DISCLOSURE OF INVENTION

In general terms the present invention provides a motor control system in which power regenerated during braking is dissipated or conserved by altering the composition of the drive waveform. This approach to does not require additional switches beyond those of the inverter output stage to control the flow of regenerated power through the resistor, as is the case with prior art systems.

The invention is an apparatus for dissipating regenerated power generated from an induction motor having more than three phases, and comprises an inverter providing more than three different phases of an alternating current output drive waveform, a regenerated power sink, a controller for altering the harmonic content of the output drive waveform provided by the inverter, and a detector for detecting regenerated power when the motor is used as a brake. The inverter is connected to the motor with a first mesh connection, in which each motor phase is electrically connected to a first inverter terminal and a second inverter terminal L inverter terminals distant from the first inverter terminal in order of electrical phase angle, where L is the skip number, and the phase angle difference between the pair of inverter terminals to which each motor phase is connected is identical for each motor phase. When the detector detects regenerated power, it signals the controller, which alters the harmonic content of the output drive waveform so that it contains one or more additional harmonic components. The regenerated power sink has at least three elements and is connected to the inverter with a second mesh connection in which each element is electrically connected to a first inverter terminal and a second inverter terminal, and a phase difference across each element is zero in the absence of the additional harmonic component, and is not zero in the presence of the additional harmonic component. This means that when the motor is used for braking, the regenerated power is diverted through the sink; however, under normal powered operation, no power is diverted through the sink.

In one embodiment, where the motor is a high phase order motor, resistors are connected to the inverter output such that there is no electrical phase angle difference across the ends of the resistors, and therefore no voltage is developed across the resistors, and no current flows through them. This is achieved by a combination of the connection geometry and the composition of the drive waveform. The resistor array therefore does not dissipate any power under these running conditions, when the motor is operating in a driven state. Under braking conditions, the motor regenerates to the DC power supply to the inverter, leading to an increase in the DC supply voltage to the inverter. The increase is detected, and the composition of the drive waveform is modified so that there is now an electrical phase angle difference across the ends of the resistors, and ac power now flows through the resistor array, thus dissipating the brake current.

In the present invention, several polyphase devices are connected together: an inverter, and electrical rotating machine, and a resistive load or braking resistor. The purpose of the resistive load is to dissipate excess electrical power, which may be produced when the inverter acts to slow down the rotating machine, causing the rotating machine to act as a generator. In common art, this resistive load is a single DC resistor coupled to the DC link of the inverter via a separate resistor control transistor. In the present invention, the resistive load is a mesh-connected array of resistors, and is electrically connected to the same inverter output terminals that the rotating machine is connected to.

As I have previously disclosed, the impedance of a mesh connected polyphase load may be adjusted either by changing the spanning value of the mesh connection, or by changing the harmonic order produced by the inverter. In the present invention, the rotating machine and the mesh connected resistor array are internally connected with different mesh connections; optionally the rotating machine may be star connected. The mesh connection of the resistor array is selected so that when the rotating machine is operated normally at its design point, no voltage difference is present across any of the resistors. Essentially, a mesh connection and harmonic order are selected such that the impedance of the resistor array is infinite.

When it is desired that the resistors absorb energy, for example from a braking operation, then the harmonic content of the inverter output is adjusted, thus placing voltage differences across the resistor array and causing current to flow in the resistors.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

Figure 1:
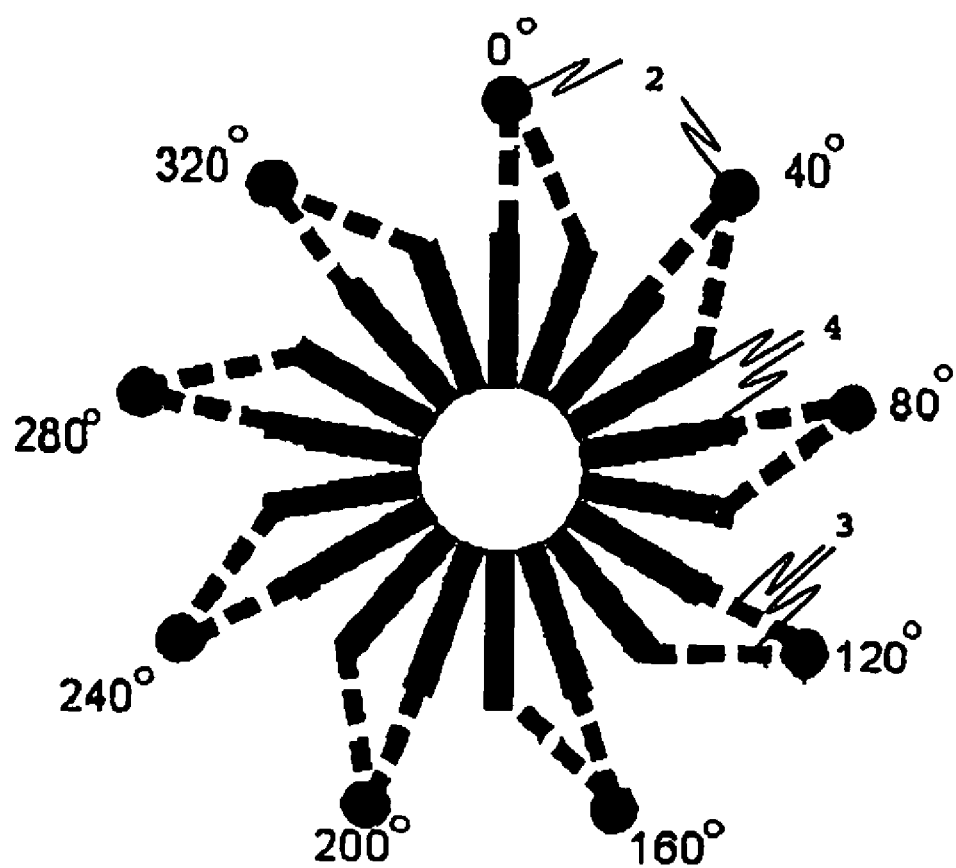
FIG. 1 illustrates how the winding terminals of a polyphase motor may be connected to a polyphase inverter.

In an induction machine, each phase winding set can be described by two terminals. There may be a larger number of terminals, but these are always grouped in series or parallel groups, and the entire set can be characterized by two terminals. In a star connected machine, one of these terminals is driven by the inverter or power supply, while the other terminal is connected to the machine neutral point. All current flows through one terminal, through the neutral point into other windings, and though the driven terminals of the other phases. In a mesh-connected machine, these two terminals are connected directly to two different supply points. An example of how this may be done is shown in FIG. 1, in which the stator slots 4 are shown as straight lines running down the inside of the stator, and inverter terminals 2, are shown as circles, alongside which is marked phase angles of each of the inverter terminals. Electrical connections 3 between the winding terminals in stator slots 4 and inverter terminals 2 are represented by dashed lines. Two winding halves are displayed opposite one another, and are actually joined to one another, although this is not shown. The configuration describes a 9 phase machine connected with an L=4 connection—identical to FIG. 2e.

In contrast to three phase systems, in which there are only three inverter terminals and six motor windings terminals, in a high phase count system with N phases, there are N inverter terminals and 2N motor windings terminals. There are thus a substantial number of choices for how an N phase system may be mesh connected. This set of choices is greatly reduced by rotational symmetry requirements, specifically each winding must be connected to two inverter terminals with the same electrical angle difference between them as for every other winding.

Figure 2:
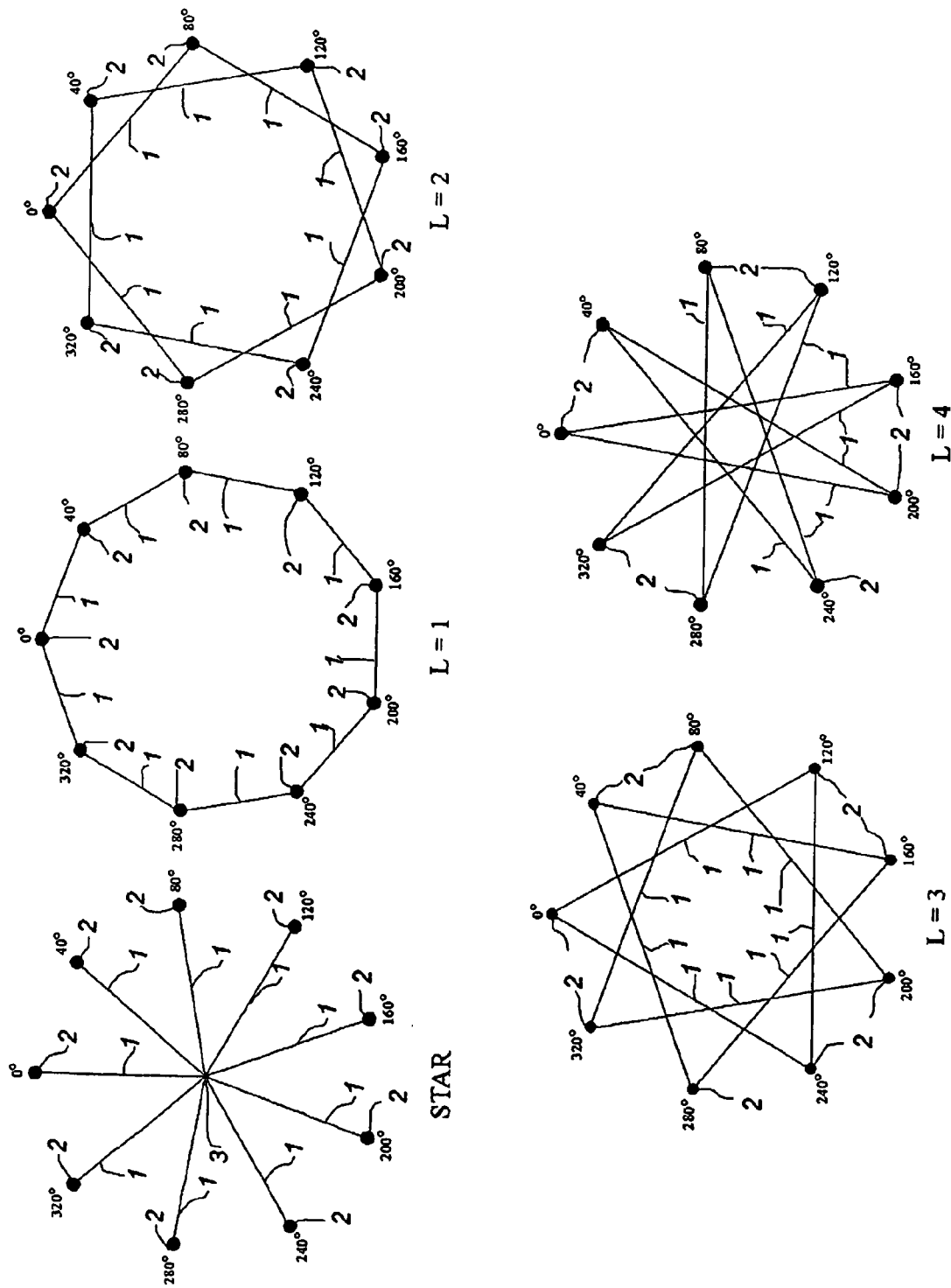
FIG. 2 illustrates a plurality of ways in which the polyphase inverter may be connected to a polyphase motor.
Figure 3A:
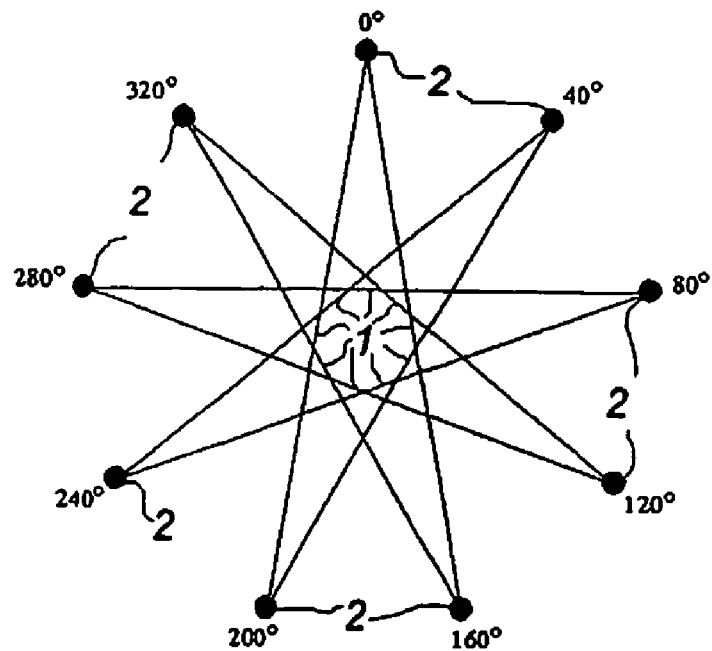
FIG. 3 illustrates how winding terminals of a motor connected to a polyphase inverter in a particular fashion may be driven by the inverter with various phase angles.
Figure 3B:
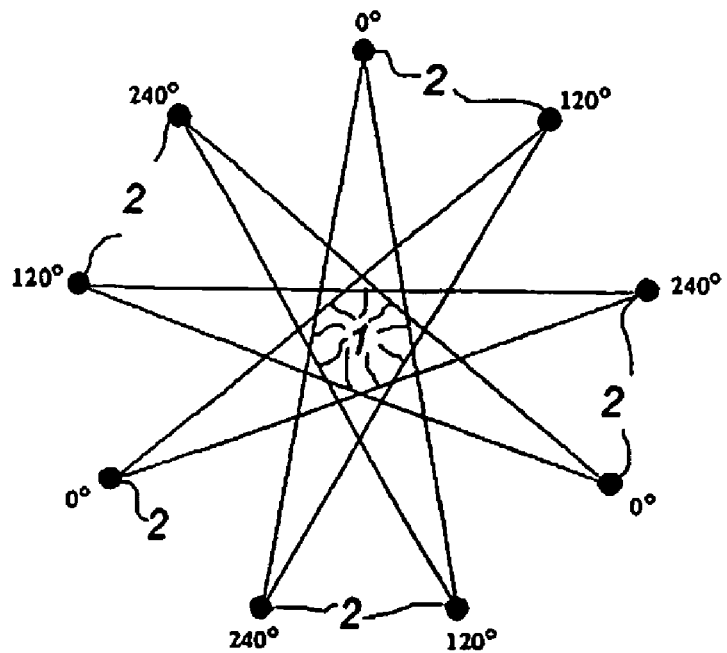
Figure 3C:
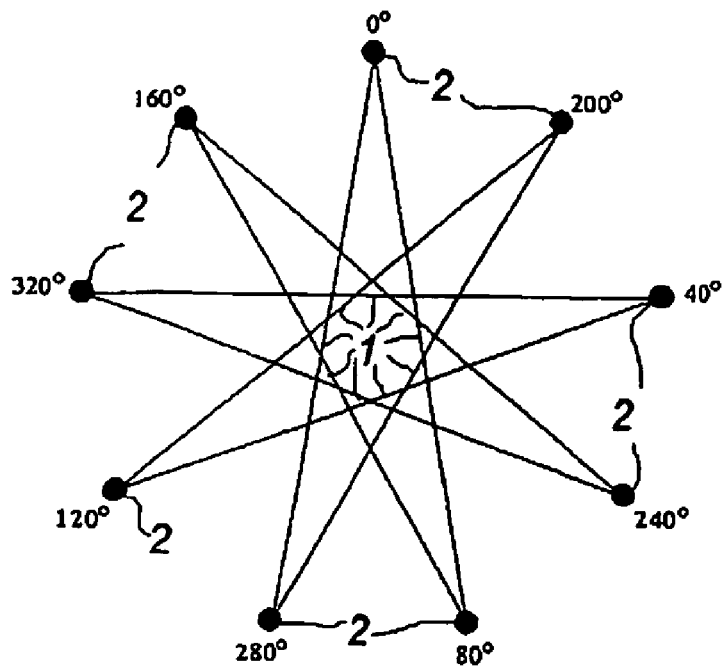
Figure 3D:
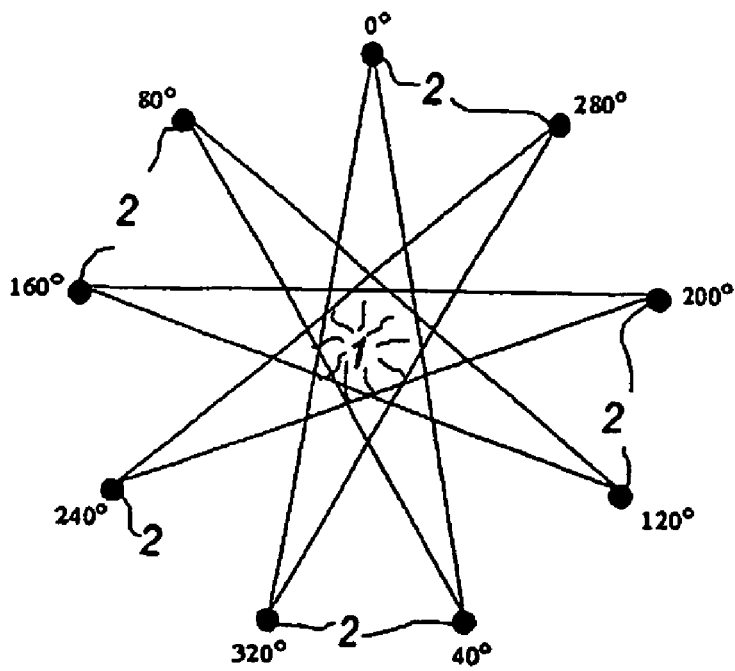

A simple graphical schematic of the permissible inverter to motor windings connections may thus be described, for a polyphase motor having N phases. FIG. 2 shows N evenly spaced points and a center point. Each of these points represents an inverter terminal 2, to which one of the terminals of each of one or more motor windings 1 may be connected. Permissible connections of the N phase windings are either from the center point, to each of the N points on the circle (this being the star connection shown as FIG. 2a) or from each of the N points to another point L points distant in the clockwise direction, where L is one greater than the number of skipped points (inverter terminals). It will be noted that for each L from 1 to (N-1)/2 there is a corresponding L from N/2-1/2 to N that produces a mirror image connection.

FIG. 2 shows all permissible connections for a 9 phase system from L=1 to L=4 as well as the star connection. Noted on the star connection diagram are the relative phase angles of the inverter phases driving each terminal. For a given inverter output voltage, measured between an output terminal and the neutral point, each of these possible connections will place a different voltage on the connected windings. For the star connection, the voltage across the connected windings is exactly equal to the inverter output voltage. However, for each of the other connections, the voltage across a winding is given by the vector difference in voltage of the two inverter output terminals to which the winding is connected. When this phase difference is large, then the voltage across the winding will be large, and when this phase difference is small, then the voltage across the winding will be small. It should be noted that the inverter output voltage stays exactly the same in all these cases, just that the voltage difference across a given winding will change with different connection spans. The equation for the voltage across a winding is given by: $2*\sin((phasediff)/2)*Vout$ where phasediff is the phase angle difference of the inverter output terminals driving the winding, and V is the output to neutral voltage of the inverter.

Thus, referring to FIG. 2, when L=1, the phase angle difference is 40 degrees, and the voltage across a winding is 0.684 Vout. When L=2, the phase angle difference is 80 degrees, and the voltage across the winding is 1.29 Vout. When L=3, the phase angle difference is 120 degrees, and the voltage across the winding is 1.73 Vout. Finally, when L=4, the phase angle difference is 160 degrees, and the voltage across the winding is 1.97 Vout. For the same inverter output voltage, different connections place different voltage across the windings, and will cause different currents to flow in the windings. The different mesh connections cause the motor to present different impedance to the inverter. In other words, the different mesh connections allow the motor to use the power supplied by the inverter in different rations of voltage and current, some ratios being beneficial to maximize the torque output (at the expense of available speed), and some ratios to maximize the speed output (at the expense of maximum available torque).

To deliver the same power to the motor, the same voltage would have to be placed across the windings, and the same current would flow through the windings. However, for the L=1 connection, to place the same voltage across the windings, the inverter output voltage would need to be much greater than with the L=4 connection. If the inverter is operating with a higher output voltage, then to deliver the same output power it will also operate at a lower output current. This means that the L=1 connection is a relatively higher voltage and lower current connection, whereas the L=4 connection is a relatively lower voltage, higher current connection.

The L=2 connection is desirable for low speed operation, where it increases the overload capabilities of the drive, and permits much higher current to flow in the motor windings than flow out of the inverter terminals. The L=4 connection is desirable for high speed operation, and permits a much higher voltage to be placed across the windings than the inverter phase to neutral voltage. This change in connection is quite analogous to the change between star and delta connection for a three phase machine, and may be accomplished with contactor apparatus. However the number of terminals renders the use of contactors to change machine connectivity essentially impracticable.

There is, however, an additional approach available with high phase order inverter driven systems.

The inverter, in addition to being an arbitrary voltage and current source, is also a source of arbitrary phase AC power, and this output phase is electronically adjustable. Any periodic waveform, including an alternating current may be described in terms of amplitude, frequency, and phase; phase is a measure of the displacement in time of a waveform. In a polyphase inverter system, phase is measured as a relative phase displacement between the various outputs, and between any pair of inverter terminals, an electrical phase angle may be determined. In the case of conventional three phase systems, this electrical phase angle is fixed at 120 degrees. However in polyphase systems this phase angle is not fixed. Thus, while the machine terminals 1 . . . 9 may be fixed in their connection to inverter terminals 1 . . . 9, the phase relation of the inverter terminals connected to any given motor winding terminals is not fixed. By changing the inverter phase relation, the impedance that the motor presents to the inverter may be changed. This may be done without contactors.

Fundamental phase relation is both the relative electrical angle of each winding terminal and relative phase relation of the currents driving each winding terminal, such that the stator develops the lowest pole count without discontinuities. In a two pole machine, driving with fundamental phase relation causes the electrical angle of each winding terminal, as well as the phase angle of the currents driving each winding terminal, to be equal to the physical angle of the winding slot associated with that winding terminal. In a four pole machine, the phase angle is equal to double the physical angle of the slot, and in general for an N pole machine the electrical angle between any two slots, and the electrical phase relation of the currents driving those two slots, is equal to N/2 times the physical angle between those two slots.

With reference to FIG. 3, a 9 phase machine is connected to the inverter system using the L=4 mesh. One terminal of each of two windings 1 is connected to each inverter terminal 2. When driven with 'first order' phase differences, then the results are as described above for the L=4 mesh. However, if the phase angles are adjusted by multiplying each absolute phase reference by a factor of three, then the phase differences placed across each winding become the same as those found in the L=3 case, although the topological connectivity is different. If the phase angles are adjusted by a multiplicative factor of five, then the voltages across windings become like those of the L=2 case, and with a multiplicative factor of seven, the voltages become like those of the L=1 case. A multiplicative factor of nine causes all phases to have the same phase angle, and places no voltage difference across the winding.

These changes in phase angle are precisely the changes in phase angle used to change the operating pole count of a high phase order induction machine, as described in others of my patent applications and issued patents.

If a high phase count concentrated winding induction machine is operated by an inverter, but is connected using a mesh connection, then changes in pole count of the machine will be associated with changes in machine effective connectivity. These changes in effective connectivity permit high current overload operation at low speed, while maintaining high speed capability, without the need for contactors or actual machine connection changes.

Of particular value are machines connected such that the fundamental, or lowest pole count, operation is associated with a relative phase angle across any given winding of nearly, but not exactly, 120 degrees. In these cases, altering the output of the inverter by changing the absolute phase angles by a multiplicative factor of three, which may also be described as operation with the third harmonic will result in the relative phase angle across any given winding becoming very small, and causing large winding currents to flow with low inverter currents. A particular example would be a 34 slot, 17 phase machine, wound with full span, concentrated windings, to produce a two pole rotating field. The winding terminations are connected to the inverter using the L=6 mesh. The relative phase angle of the inverter outputs placed across any given winding would be 127 degrees, and the voltage placed across this winding relative to the inverter output voltage is 1.79 times the inverter output voltage. If the machine is then operated with a third harmonic waveform, it will operate as a six pole machine. The relative phase angle across any given winding is now 127*3mod 360=21 degrees, and the voltage placed across the winding relative to the inverter output voltage is 0.37 times the inverter output voltage. Simply by changing the inverter drive angles, the Volts/Hertz relationship of the motor is increased, and inverter limited overload capability is enhanced.

To determine the ideal L, the number of skipped inverter terminals between the winding terminals of each phase of the motor, which would result in the greatest change of impedance when the inverter drives the motor with substantial third harmonic, one would use the formula (N/3)-1, rounded to the nearest integer, for values of N (number of phases in motor) not divisible by 3. When N is divisible by 3, one would use the formula N/3 to determine the skip number.

Other connectivity is certainly possible. The connection described above will tend to maximize machine impedance for the third harmonic, but will actually decrease machine impedance for fifth harmonic. A connection that most closely approximates full bridge connection, e.g. the L=8 connection for the 17 phase machine described above, will show gradually increasing machine impedance for the $3^{rd}$, $5^{th}$, $7^{th}$, $9^{th}$, $11^{th}$, $13^{th}$, and $15^{th}$ harmonics. This may be of particular benefit, for example, with machines operated with square wave drive. Operation with high pole counts is not generally considered preferable, however it may be of benefit in the particularly desirable case of operating at high overload and low speed. The number of slots is not restricted, nor are the number of phases or poles. In order to determine the value of L in the winding to inverter connections, one may use the formula (N-1)/2, when N (number of motor phases) is an odd number. When N is even by may be divided into subsets of odd phase counts, the formula may similarly be used for the odd subsets.

Figure 4:
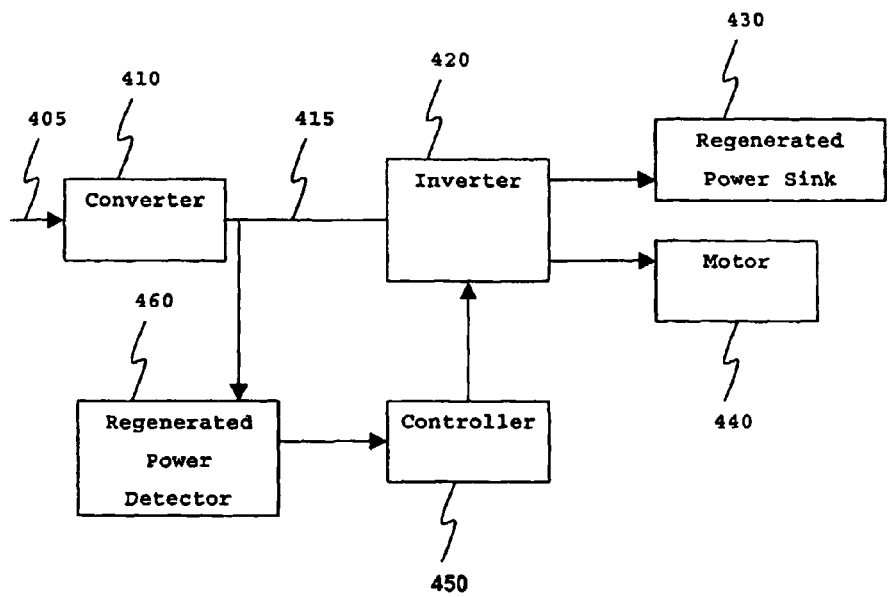
FIG. 4 is a block diagram showing regenerative braking.

Referring to now to FIG. 4, a converter 410 converts the alternating current 405 from a three-phase AC mains supply into a direct current. An inverter 420 is connected to the DC side of the converter, and converts the constant DC voltage into a variable voltage, variable frequency (VVVF) AC voltage by pulse-width control. A motor 440 is connected to the inverter. A regenerated power-detecting means in the form of a voltage detector 460 is adapted to detect the DC voltage supplied to the inverter. This is actuated when the voltage exceeds a predetermined value such as to cause a controller 450 to change the composition of the drive waveform produced by the inverter; regenerated power is thereby diverted to a regenerated power sink 430, which is also connected to the inverter. The regenerated power sink allows power regenerated by the motor to be efficiently and safely handled. The sink may be any device that dissipates or conserves power, and may be, by way of example, a resistor array, a battery array, a potential energy storage unit, or a means of returning power to the AC mains supply.

Figure 5:
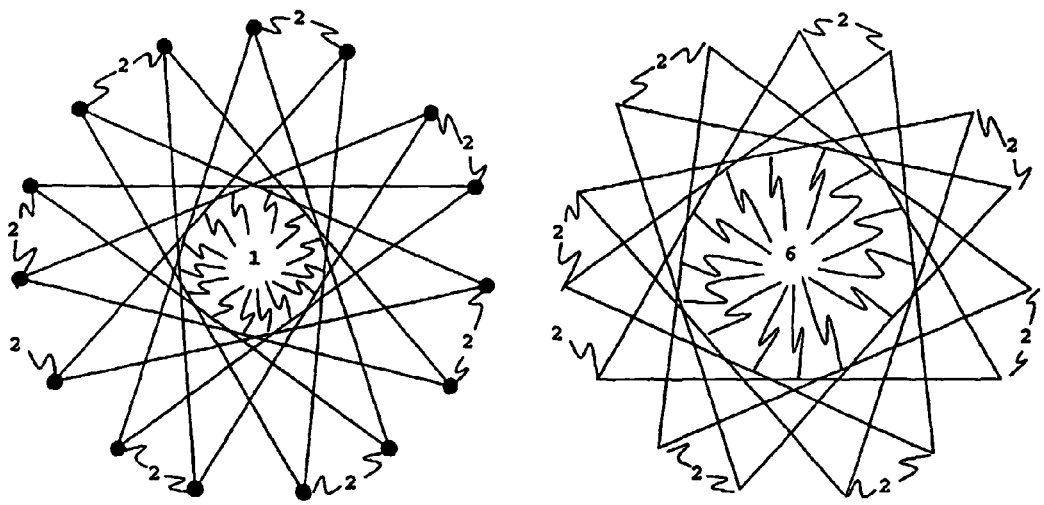
FIG. 5 illustrates the connection of a polyphase inverter to a polyphase motor and a resistor array.

In a preferred embodiment, inverter 420 is a 15-phase inverter and motor 440 is a 15-phase motor. Referring now to FIG. 5, which shows 15 evenly spaced points and a center point. Each of these points represents an inverter terminal 2, to which one of the terminals of each of one or more motor windings 1 may be connected. FIG. 5 shows motor windings connected through an L=6 connection, and the motor is driven using a third harmonic drive waveform. This means that the phase angle is 144×3=72 (432) degrees, and the voltage across the windings is 1.18 Vout. FIG. 5 also shows resistors 6 which are connected to the inverter through an L=5 connection, giving a phase angle of 120×3=0 (360) degrees, or 0 (360) degrees effective phase angle using the third harmonic drive waveform. The voltage across the resistors under these conditions is zero.

Under braking, the motor regenerates to the DC side of the inverter, leading to an increase in the DC voltage. This increase is detected, and the controller changes the composition of the drive waveform.

For example, the fundamental content of the drive waveform may be increased, which changes the effective phase angle to the windings from 72 to 144 degrees, and the voltage across the windings increases to 1.90 Vout. Similarly the effective phase angle across the resistor matrix changes from 0 to 120 degrees, and the voltage across the resistors increases to 1.73 Vout.

It is important to note that the motor must always have current going through it, as the motor cannot regenerate unless it is also activated. This means that harmonics may be added to the inverter output so that the resistor array is also activated. Alternatively the output can be switched to a harmonic that both the resistor array and the motor can tolerate e.g. fundamental.

By adjusting the relative proportions of fundamental or fifth harmonic content of the drive waveform, the amount of power dissipated through the resistor array may be controlled to match the power regenerated by the motor.

In the above description, the resistor array has the same number of phases as the motor. The present invention also envisages a resistor array that has fewer phases than the motor, but which may still be activated in the manner disclosed above. For example, in the example above, if the resistor array is a three phase array, and is connected in a delta configuration, then the angle between the phases is still 0/360 degrees when driven by third harmonic.

The present invention has been described with regard to rotary induction motors, however it may be implemented with linear induction motors too, using similar techniques for changing winding impedance. Where the windings of a linear or also of a rotary induction motor comprise single inductors instead of coils, then inverter output phase angle may be altered by an even multiplicative factor in order to effect impedance changes. In some cases, the inverter may even multiply each phase angle by a fractional factor to vary the impedance of the motor.

The word "terminal" has been used in this specification to include any electrically connected points in the system—this may be a screw, for example, or any electrical equivalent, for example, it may simply comprise a wire connecting two components in a circuit.

In a similar sense, inverter output elements are commonly half bridges, but they may alternatively comprise other switching elements. One embodiment of the present specification has described two winding terminals connected to a single inverter terminal. The single inverter terminal referred to is intended to also include electrical equivalents, such as a device made of two inverter terminals that are electrically connected together.

INDUSTRIAL APPLICABILITY

The present invention has a number of applications where breaking occurs, such as traction applications, including cars, trains, trams, and other winding applications, including cranes, excavators and the like.

While this invention has been described with reference to numerous embodiments, it is to be understood that this description is not intended to be construed in a limiting sense. Various modifications and combinations of the illustrative embodiments will be apparent to persons skilled in the art upon reference to this description. It is to be further understood, therefore, that numerous changes in the details of the embodiments of the present invention and additional embodiments of the present invention will be apparent to, and may be made by, persons of ordinary skill in the art having reference to this description. It is contemplated that all such changes and additional embodiments are within the spirit and true scope of the invention as claimed below.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. Apparatus for dissipating regenerated power generated from an induction motor having more than three phases, comprising:
   a) an inverter for the synthesis of N different phases of alternating current output drive waveform, where N is greater than three, and connected to said motor with a first mesh connection, said first mesh characterized in that: each motor phase is electrically connected to a first inverter terminal and a second inverter terminal L inverter terminals distant from the first inverter terminal in order of electrical phase angle, where L is the skip number, and the phase angle difference between the pair of inverter terminals to which each motor phase is connected is identical for each motor phase;
   b) a regenerated power sink having at least three elements and connected to said inverter with a second mesh connection;
   c) a controller for altering the harmonic content of said output drive waveform;

d) a detector for detecting said regenerated power, and for signaling to said controller upon such detection, wherein said controller causes the output drive waveform to comprise one or more additional harmonic components; and wherein said second mesh is characterized in that: each element is electrically connected to a first inverter terminal and a second inverter terminal, and a phase difference across each element is zero in the absence of said additional harmonic components, and is not zero in the presence of said additional harmonic components.

2. The apparatus of claim 1 in which said regenerated power sink is selected from the group consisting of: a resistor array, a battery array, a potential energy storage unit, or a means of returning power to an AC mains supply.

3. The apparatus of claim 1 wherein N is a multiple of three; wherein said regenerated power sink comprises three elements; wherein said second mesh connection comprises a delta connection; and a phase difference across each element is zero when said output drive waveform consists of third harmonic, and is not zero in the presence of said additional harmonic components.

4. The apparatus of claim 1 wherein said motor has 15 phases; wherein N is 15; wherein said output drive waveform consists of third harmonic; wherein L is 6; wherein said second mesh connection characterized in that: each motor phase is electrically connected to a first inverter terminal and a second inverter terminal 5 inverter terminals distant from the first inverter terminal in order of electrical phase angle; and wherein said controller causes the output drive waveform to comprise fundamental.

* * * * *